April 12, 1949.    S. H. STUPAKOFF ET AL    2,466,974
EXPANDING CHUCK
Original Filed Dec. 9, 1942    2 Sheets-Sheet 1
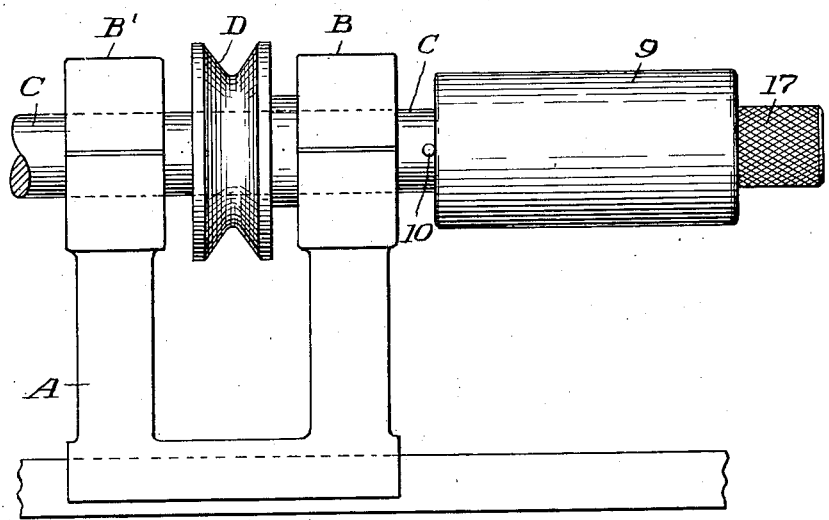
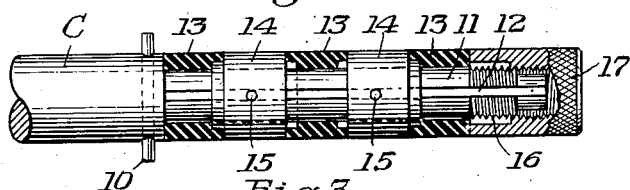
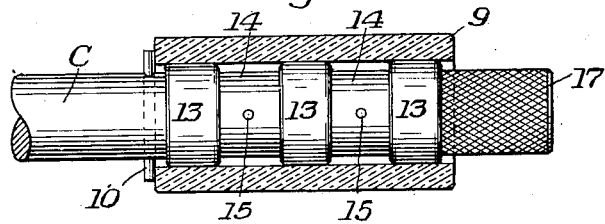
INVENTORS
Semon H. Stupakoff
Rawson E. Stark
ATTORNEYS April 12, 1949.   S. H. STUPAKOFF ET AL   2,466,974
EXPANDING CHUCK
Original Filed Dec. 9, 1942                    2 Sheets-Sheet 2
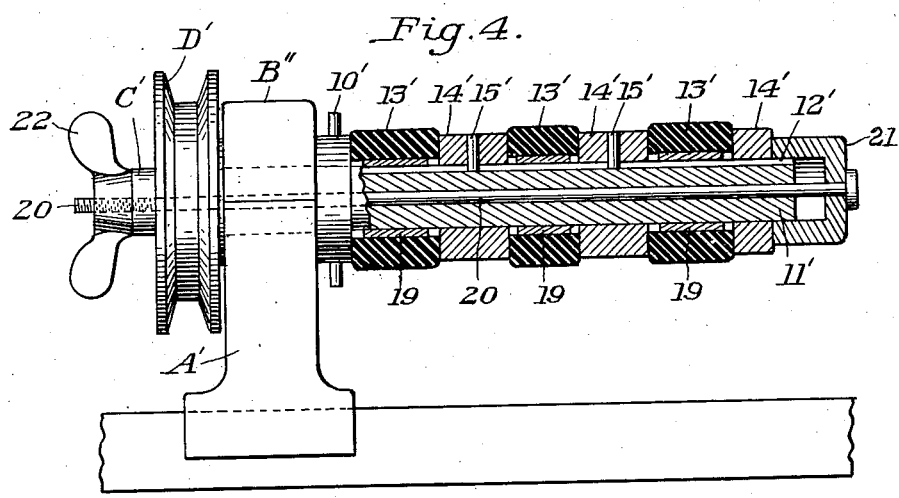
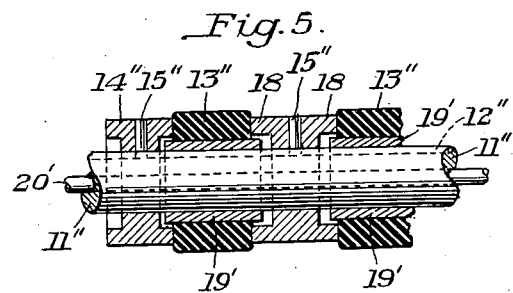
INVENTOR
Semon H. Stupakoff
Rawson E. Stark
ATTORNEYS Patented Apr. 12, 1949

2,466,974

UNITED STATES PATENT OFFICE 2,466,974

EXPANDING CHUCK

Semon H. Stupakoff, Latrobe, and Rawson E. Stark, Greensburg, Pa., assignors to Stupakoff Ceramic & Manufacturing Company, Latrobe, Pa., a corporation of Pennsylvania Original application December 9, 1942, Serial No. 468,411. Divided and this application November 17, 1945, Serial No. 629,218

4 Claims. (Cl. 279—2)

In accordance with the present invention, there are provided certain improvements in work-holding instrumentalities, which instrumentalities are designed especially for mounting on a lathe of a type that is intended for use in the manufacture of coil forms made of ceramic compositions, such as steatite porcelain, for example, although it will be understood that the instrumentalities of the present invention are not limited to such adaptation.

Various types of radio equipment require insulating cores or forms about which wire is wrapped to form an inductance. Extreme accuracy is required in such devices. The surface of the core or form is threaded to receive the convolutions of wire and hold them in spaced relation. The forms must be of a predetermined fixed diameter which must be adhered to within very close tolerances and they must be of predetermined length. In some cases it is necessary that the core be frustro-conical in shape or that a portion thereof be tapered.

The present invention provides a work-holder for holding blanks of a ceramic composition of the above-indicated character, from which blanks the cores are produced, the work-holder being especially suitable for mounting on a lathe intended for performing work of the above-indicated character. The lathe and work-holder are designed so that the work-piece can be mounted quickly and readily thereon, the necessary machining operations performed, and the resulting piece easily removed. Provision is made whereby the thread-cutting operation will begin at a predetermined point and terminate at another predetermined point. Provision is also made whereby the part may be very quickly and rapidly reduced to its desired diameter or contour and cut off to the desired length, the arrangement being such that the cutting off operation can be performed at only predetermined definite points. This prevents the operator from spoiling the piece by cutting it in the wrong place. While the holder of the present invention will be shown and described in connection with a lathe adapted to perform the above-indicated operations, it will be understood that this adaptation is by way of illustration and example only, and that the work-holder of the invention is adapted to any adaptation wherein predetermined machining operations of the above-indicated type are to be performed.

The invention may be understood more readily by reference to the accompanying drawings, in which:

Fig. 1 is a front elevation of an assembly of the chuck of the present invention mounted on driving instrumentalities for rotating the chuck, with a work-piece, fragmentarily shown, mounted on the chuck;

Fig. 2 is a detailed view, partly in section and partly in elevation, of one form of the chuck of the present invention adapted to hold the work-piece shown in Fig. 1;

Fig. 3 is a view similar to Fig. 2, showing the chuck expanded within the work-piece;

Fig. 4 is a front view, partly in section and partly in elevation, of a modification of the chuck assembly shown in Fig. 1; and Fig. 5 is a fragmentary view, partly in section and partly in elevation, of another form of the chuck assembly shown in Fig. 4.

Referring more particularly to the drawings, and first to Fig. 1, reference character A designates a frame provided with head stocks B and B' through which passes a shaft C, on which is mounted a pulley wheel D, this being adapted to be driven from a suitable driving mechanism (not shown) for rotating the shaft.

On the opposite end of the shaft is a work-holding chuck or mandrel, designated generally at 9, which may be in the form as shown in Figs. 2 and 3; as illustrated in these views, the shaft C has a transverse pin therethrough at the inner end of the mandrel. Forwardly of this pin the mandrel or shaft has a portion 11 of reduced diameter along which is a key-way 12. There is a series of expansible collars 13 fitted about the portion 11 and between each two expansible collars is a metal ring 14, which ring is provided with a pin 15 that enters the key-way 12 so that the collars 14 rotate with the spindle but are free to slide along on the spindle. The outermost end of the spindle is threaded, as indicated at 16, to receive a knurled nut 17. This nut bears against the endmost rubber collar 13. When the nut 17 is turned relatively to the spindle, its inner end presses against the first rubber collar. This, in turn, presses against the first metal ring 14, which again in turn transmits pressure to the second rubber collar. From the second rubber collar pressure is transmitted through the second ring 14 to the third rubber collar. With this arrangement, all of the rubber collars may be equally expanded, as indicated in Fig. 3.

The work-piece, designated specifically as 9 in Fig. 3, has an internal diameter slightly larger than the normal diameter of the mandrel. It is slipped over the mandrel until its inner end contacts the cross pin 10. Then the nut 17 is turned to expand the rubber collars. Due to the fact that the metal rings 14 between the rubber collars are keyed to the shaft and frictionally press against the rubber, the rubber collars cannot turn relatively to the spindle. The workpiece thus is frictionally held by the rubber collars to rotate with the spindle.

In order to remove the work-piece, the nut 17 is turned in the opposite direction and the resilience of the rubber rings causes the mandrel to collapse. This operation of mounting the workpiece on the mandrel can be performed very quickly and rapidly and does not require a skilled machinist to apply and remove the work-piece.

Fig. 4 shows a modification of the chuck assembly of Fig. 1. In this modification, the shaft C' has been bored longitudinally to provide for the insertion of the rod 20, which rod is threaded at its left end to engage the wing nut 22. A cap or other abutment 21 is secured to the right end of the rod 20 by flattening or riveting the projecting end of this rod against the head of the cap 21, as shown, or by other suitable means of fastening. The internal diameter of the cap 21 is such as to enable it to slide easily over the outer end of the reduced portion 11 of the shaft. An operating device for the rod, such as a wing nut 22 at the left end of the shaft is provided, and by tightening this nut the cap 21 is drawn to the left so as to exert longitudinal pressure against the rubber and metal ring assembly and thus effect the radial expansion of the rubber collars.

In Fig. 4 there is also shown, in section, a further modification of the chuck of Fig. 2. This modification consists of mounting the rubber collars 13' upon metal sleeves 19, the length of these metal sleeves being less than the length of the rubber collars, so that the rubber collars overlap the metal sleeves. Hence, when the rubber collar is longtiudinally compressed it will tend to buckle radially so as to engage the hollow workpiece, but, by reason of the metal sleeve 19, any tendency of the rubber collar 13' to bind against the shaft 11' will be prevented.

In Fig. 5 there is shown a small cross sectional view of a modification of the work-holding mandrel of Fig. 4. In this modification the metal rings 14" are reamed out at both ends so as to provide annular abutments or rims, designated as 18, which are used to transmit longitudinally the pressure exerted by the combined action of the cap 21 and the wing nut 22 for the radial expansion of the rubber collars 13". As in Fig. 4, the rubber collars 13" are again mounted upon metal sleeves 19', but, in Fig. 5, the length of the metal sleeves is made greater than that of the rubber collars, in contradistinction to Fig. 4. As shown, the proper precaution has been taken in the design of the metal rings and metal sleeves as to clearance, so as to prevent the metal sleeves from blocking off the longitudinal transmission of pressure along the shaft for radial expansion of the rubber collars.

Although Figs. 1 to 3 have shown a nut threaded on the end of the shaft and Figs. 4 and 5 have shown an endwise movable abutment on the shaft operating with means at the opposite end of the shaft, it is understood that these arrangements will be interchangeable in the respective modifications.

It is evident that the specific embodiments of the invention as shown in this specification are merely by way of illustration, and it is not desired to restrict the scope of the invention thereto.

This application is a division of our application, Serial No. 468,411, filed December 9, 1942, now Patent No. 2,392,427.

We claim:

1. A work-holder for holding hollow workpieces, comprising a hollow shaft, a plurality of rings splined on the shaft whereby they may be adjusted longitudinally of the shaft but rotate with it, a plurality of sleeves on the shaft interposed between the rings, a rubber collar carried by each of the sleeves, a rod positioned inside the shaft, the rod having a cap secured to its one end for slidable engagement over the one end of the shaft for abutment of the ring and rubber collar assembly on the shaft, and said rod having a threaded portion at its opposite end for engagement with a nut abutting the opposite end of the shaft, means for rotation of the nut for radial expansion and contraction of the ring and rubber collar assembly.

2. A work-holder for holding a hollow workpiece comprising a shaft, a plurality of spaced expansible collar elements on the shaft, spacing rings intermediate the expansible collar elements and through which endwise pressure may be transmitted from one expansible collar element to another to expand the same, an abutment on one end of the shaft over which work-pieces may be slipped to encircle the collars, a rod passing through the shaft and connected with the abutment for forcing the abutment endwise of the shaft to apply pressure to or release pressure from the collars, and means at the opposite end of the shaft for operating same.

3. A work-holder for holding a hollow workpiece comprising a shaft, a plurality of spaced sleeve elements on the shaft, a plurality of expansible collar elements carried by the sleeve elements, spacing rings intermediate the expansible collar elements and through which endwise pressure may be transmitted from one expansible collar element to another to expand the same, and adjustable means on the end of the shaft and over which work-pieces may be applied and removed for applying endwise pressure to the collar and ring elements for operating the device.

4. A work-holder for holding a hollow workpiece comprising a shaft, a plurality of spaced sleeve elements on the shaft, a plurality of expansible collar elements carried by and encircling the sleeve elements, spacing rings intermediate the expansible collar elements and through which endwise pressure may be transmitted from one expansible collar element to another to expand the same, an abutment on one end of the shaft over which work-pieces may be slipped to encircle the collars, and means at the same end of the shaft for forcing the abutment endwise of the shaft to apply pressure to or release pressure from the collar.

SEMON H. STUPAKOFF.
RAWSON E. STARK.

REFERENCES CITED

The following references are of record in the file of this patent:

UNITED STATES PATENTS

| Number | Name | Date |
| --- | --- | --- |
| 163,217 | Lawson | May 11, 1875 |
| 574,763 | Rudolph | Jan. 5, 1897 |
| 780,850 | Williams | Jan. 24, 1905 |
| 1,479,253 | Rivetta | Jan. 1, 1924 |

FOREIGN PATENTS

| Number | Country | Date |
| --- | --- | --- |
| 109,231 | Great Britain | Sept. 6, 1917 |